United States Patent [19]

Murakami et al.

[11] Patent Number: 4,560,027
[45] Date of Patent: Dec. 24, 1985

[54] POWER UNIT SUPPORTING STRUCTURE

[75] Inventors: Takuya Murakami, Zama; Masaru Saotome, Fujisawa, both of Japan

[73] Assignee: Nissan Motor Co., Ltd., Yokohama, Japan

[21] Appl. No.: 548,569

[22] Filed: Nov. 4, 1983

[30] Foreign Application Priority Data

Nov. 9, 1982 [JP] Japan ............................ 57-196203

[51] Int. Cl.⁴ .......................................... B60K 5/12
[52] U.S. Cl. .................................. 180/312; 180/291
[58] Field of Search .............. 180/291, 292, 297, 300, 180/312

[56] References Cited

U.S. PATENT DOCUMENTS 3,326,501  6/1967  Cauvin .............................. 180/297
3,776,354 12/1973  Duclo et al. ...................... 180/297
4,240,517 12/1980  Harlow, Jr. et al. ............ 180/297
4,413,701 11/1983  Kumagai ............................ 180/297
4,483,408 11/1984  Yazaki ............................... 180/297

Primary Examiner—Joseph F. Peters, Jr.
Assistant Examiner—Kenneth R. Rice
Attorney, Agent, or Firm—Schwartz, Jeffery, Schwaab, Mack, Blumenthal & Evans

[57] ABSTRACT

A power unit supporting structure for supporting a power unit on the body of a vehicle through the intermediary of a plurality of elastic support means. The structure comprises at least two first elastic support members for supporting a differential-gear-side portion of the power unit on the vehicle body at two points, and at least one second elastic support member for supporting the portion of the power unit longitudinally opposite the differential gear.

5 Claims, 2 Drawing Figures

POWER UNIT SUPPORTING STRUCTURE

BACKGROUND OF THE INVENTION

This invention relates to a power unit supporting structure for supporting a power unit which has a engine proper, a clutch, a transmission and a differential gear, the clutch, the transmission and the differential gear being integrally connected with the engine proper.

In general, there has been known a front-engine and front-drive type vehicle or a rear-engine and rear-drive type vehicle in which an engine proper is disposed transversely of the vehicle body or in the right-and-left direction thereof so as to reduce the dimension of an engine room in the fore-and-aft direction for enlargement of the space inside a passenger room. In such a vehicle, as shown in FIG. 1, a transmission 3 is integrally connected with a transversely disposed engine 1 through the intermediary of a clutch 2, and a differential gear 4 is in turn integrally connected with the transmission 3 so that the clutch 2, the transmission 3 and the differential gear 4 jointly constitute a so-called transaxle 5 which in turn forms, together with the engine proper 1, a power unit 6. Arrow F indicates the forward direction of the vehicle. The power unit 6 is supported by a vehicle body 8 through a plurality of supporting means 7 each having an insulator 7a molded from rubber so that vibrations of the power unit 6 to be transmitted to the vehicle body 8 can be reduced to a substantial extent by means of the rubber insulators 7a. Connected with the differential gear 4 through joints 11, 12 are a pair of drive shafts 9, 10 extending laterally from the right and the left side thereof, the right-hand side drive shaft 9 on the side of the engine proper 1 being longer than the left-hand side drive shaft 10 on the side of the transmission 3 due to the fact that the engine proper 1 is disposed offset to the left from the center of the vehicle body. Therefore, the right-hand side drive shaft 9 is comprised of an intermediate shaft 9a arranged in concentric relation with the rotation axis C of the differential gear 4, and an end shaft 9b coupled as its one end with the intermediate shaft 9a through an intermediate joint 13 and at its other end with a wheel 14b. The end shaft 9b is designed to be of the same length as that of the left-hand side drive shaft 10 so that the shafts 10 and 9a are disposed at the same angle of inclination with respect to rotation axis C of the differential gear 4 thereby to the prevent generation of an unequalized steering torque. The intermediate shaft 9a is coupled at its one end with the output shaft or rotation axis C of the differential gear 4 through the joint 11 and supported at its other end by the power unit 6 through an intermediate bearing 15 attached thereto so as to be retained in alignment with the rotation axis C of the differential gear 4. Thus, when the right-side and the left-side wheels 14b and 14a are caused to bounce or rebound during travel of the vehicle, the intermediate joint 13 and the transmission-side joint 12 are flexed to absorb the oscillatory motions of the wheels 14b, 14a.

In this connection, it is to be noted that although the power unit 6 is itself supported on the vehicle body 8 by virtue of the plurality of supporting means 7, as illustrated in FIG. 1, the power unit 6 is forced due to the oscillatory motions of the wheels 14b, 14a to displace in a rolling manner thereby to deformably oscillate the rubber insulators 7a of the supporting means 7 around a central axis of rolling P, which extends through the differential gear 4 at an angle to the rotation axis C thereof. In other words, the power unit 6 is caused to oscillate greatly during abrupt changes of torque, thus developing rolling displacements.

With such a conventional support structure for the power unit 6, the axis of rolling P of the power unit 6 extends obliquely and intersects the rotation axis C of the differential gear 4 at an angle thereto so that, when the power unit 6 is caused to rollingly displace, the respective joints 11, 12 and 13, particularly the joints 12 adjacent the transmission 3 and the joint 13, are moved in a vertical direction. At this time, if the wheels 14b, 14a are bounced or rebound greatly in a direction to increase the flexing rate of the joints 12, 13, these joints 12, 13 will likely be flexed excessively beyond the allowable range of flexure. As a result, the transmission efficiency of driving force is lowered, and if the allowable range of flexure is exceeded upon bouncing of the wheels 14b, 14a, the ground-engaging forces of these wheels are reduced to impair the steering function, thus resulting in a very dangerous situation. In order to avoid such a situation, it is considered to decrease necessary the bouncing or rebounding stroke of the wheels and/or to stiffen the support means 7, but these measures give rise to another problem in that riding comfort of the vehicle is worsened.

SUMMARY OF THE INVENTION

In view of the above, an object of the present invention is to provide a novel and improved power unit supporting structure of the character described which is capable of preventing or reducing variations in position of the joints provided on the drive shafts during rolling displacements of the power unit thereby to decrease the flexing rate of the joints upon bouncing or rebounding of the wheels.

Another object of the present invention is a novel and improved power unit supporting structure of the character described which is capable of improving riding comfort of the vehicle as well as ensuring safety in driving without any reduction or lowering of driving force and steering performance.

The above and other objects, features and advantages of the present invention will become apparent from the following detailed description of a preferred embodiment when taken in conjunction with the accompanying drawings.

DESCRIPTION OF THE PREFERRED EMBODIMENT

Figure 1:
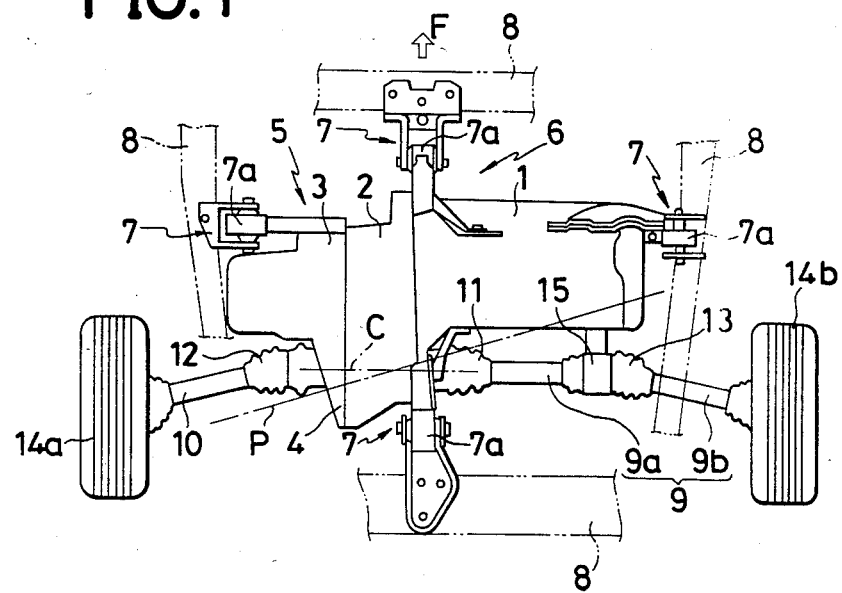
FIG. 1 is a plan view of a conventional type of power unit supporting structure.
Figure 2:
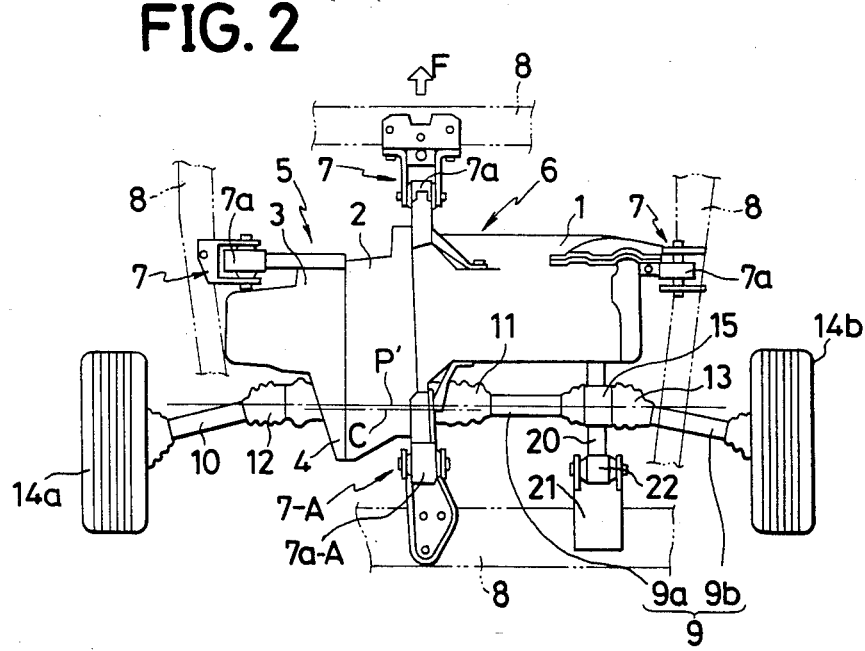
FIG. 2 is a plan view of a power unit supporting structure according to the present invention.

Referring to FIG. 2, there is shown a power unit supporting structure constructed in accordance with the principles of the present invention, in which the parts thereof corresponding to those of the conventional structure as shown in FIG. 1 are identified with the same reference as employed in the latter.

In FIG. 2, a power unit 6 comprises an engine proper 1 and a trans-axle 5 integrally connected thereto, of which latter is formed of a clutch 2, a transmission 3 and a differential gear 4, similarly to the conventional power unit as shown in FIG. 1. The power unit 6 is supported at its front and rear sides and at its right and left sides on a vehicle body 8 through the intermediary of respective support means 7 or 7-A each having an insulator 7a or 7a-A of rubber or like other elastic materials. Connected with an output shaft (not shown) of the differential gear 4 through respective joints 11, 12 are a pair of right and left drive shafts 9, 10 which extend laterally from the right and left sides thereof for connection with a right and a left wheel 14a, 14b, respectively. The right drive shaft 9 adjacent the engine proper 1 is comprised of an intermediate shaft 9a coupled with the joint 11, and an end shaft 9b coupled with the intermediate shaft 9a through an intermediate joint 13. The intermediate shaft 9a is supported at its end adjacent the intermediate joint 13 on the engine proper 1 of the power unit 6 through an intermediate bearing 15, and coupled at its other end through the joint 11 to the output shaft (not shown) of the differential gear 4 so that it is always held in alignment with the rotation axis C of the differential gear 4. According to the present embodiment, the intermediate bearing 15 attached to the engine proper 1 is also supported on the vehicle body 8 through a first bracket 20 and a second bracket 21 extending forwardly from the vehicle body 8, the first and second brackets 20, 21 being connected with each other through an insulator 22 molded from rubber or like other elastic materials. Thus, by supporting the intermediate bearing 15 on the vehicle body 8 in the above manner, the intermediate shaft 9a is elastically supported at its opposite ends on the vehicle body 8 by means of two support members, one being the brackets 20, 21 and the other being the rear support means 7-A which is disposed rearwardly of the power unit 6. In this connection, it is to be noted that the spring constant of each of the insulator 22 supporting the intermediate bearing 15 and of the insulator 7a-A of the rear support means 7-A is set to be greater than that of the respective insulators 7a of the support means 7 other than the rear support means 7-A, namely the front, the right-side and the left-side support means.

With the above construction, the intermediate shaft 9a is elastically supported on the vehicle body 8 through the insulator 22 provided on the intermediate bearing 15 and the insulator 7a-A of the rear support means 7-A so that, when the power unit 6 is displaced in a rolling manner, the central axis of rolling P' of the power unit 6 comes to be close to the axis of the intermediate shaft 9a under the action of the insulators 22 and 7a-A. In particular, as the spring constant of each of the insulators 22, 7a-A becomes greater, the central axis of rolling P' is placed more closely in coincidence with the axis of the intermediate shaft 9a. Consequently, upon rolling displacements of the power unit 6, the power unit 6 is oscillated around the central axis of rolling P', which is close to or substantially in coincidence with the axis of the intermediate shaft 9a, so that displacements of the joints 11, 12 and 13 are effectively prevented or reduced to a substantial extent. Accordingly, in case where rolling displacements of the power unit 6 takes place concurrently with bouncing or rebounding of the wheels 14a, 14b, the maximum flexing of the joint 12 on the transmission-side drive shaft 10 and of the intermediate joint 13 on the engine-proper-side drive shaft 9 can be limited within a predetermined allowable range. Therefore, according to the present invention, it is possible not only to improve riding comfort of the vehicle but also to maintain safety in driving without lowering driving force and steering performance, which would be caused in the prior art when the joints 12, 13 are flexed excessively beyond the allowable limit.

Incidentally, it should be noted that although in the above-described embodiment, for the purpose of supporting the intermediate shaft 9a on the vehicle body 8, the intermediate shaft 9a is supported thereon through the intermediary of the insulator 22, the present invention is not so limited. For example, on the intermediate shaft 9a there may be provided an additional bearing which is similarly supported on the vehicle body 8 through an insulator of elastic material.

To summarize, according to the present invention, displacements of the joints on the drive shafts, caused by rolling displacements of the power unit, can be effectively suppressed. Particularly, by setting the spring constant of an elastic insulator supporting the differential-gear-side drive shaft greater than the spring constants of the respective elastic insulators of the other support means supporting the front, the right and left sides of the power unit on the vehicle body, the central axis of rolling of the power unit can be placed close to or substantially in coincidence with the axis of rotation of the differential gear so that the displacements of the joints are substantially suppressed in a positive manner to reduce the flexures of the joints within a predetermined allowable range. As a result, it is possible to improve riding comfort of the vehicle and to prevent reduction of driving force transmitted from the engine to the wheels while ensuring satisfactory steering performance and safety in driving as well.

What is claimed is:

1. A power unit supporting structure for supporting a power unit on the body of a vehicle through the intermediary of a plurality of elastic support means,
   said power unit comprising
   an engine proper,
   a transmission integrally connected with said engine proper through a clutch, and
   a differential gear integrally connected with said transmission so as to be positioned at the front or rear side of the transmission,
   said differential gear having a pair of drive shafts extending from the opposite sides thereof in a direction transversely of said vehicle body,
   said supporting structure comprising
   at least two first elastic support members connected to said vehicle body and said power unit supporting a differential-gear-side portion of said power unit directly on said vehicle body at two points, said first elastic support members being separated along the direction of the rotation axis, and
   at least one second elastic support member connected to said vehicle body and said power unit and supporting the portion of said power unit longitudinally opposite said differential gear directly on said vehicle body.

2. A power unit supporting said structure claimed in claim 1, wherein, the spring constant of each of said first elastic supports being set to be greater than that of said second support so that the central axis of rolling of said power unit is placed close to the axis of rotation of said differential gear.

3. A power unit supporting structure claimed in claim 2, wherein, said at least one second elastic support member comprises three second elastic support members respectively supporting the front, the right and the left sides of said power unit.

4. A power unit supporting structure claimed in claim 2, wherein, one of said drive shafts comprises an intermediate shaft being supported at its end on said engine proper through an intermediate bearing and coupled at its other end to the output shaft of said differential gear, and an end shaft coupled with said intermediate shaft through a joint and connected with a wheel.

5. A power unit supporting structure claimed in claim 2, wherein one of the drive shafts comprises an intermediate shaft and an end shaft which has a substantially identical configuration to the other drive shaft, the intermediate shaft being connected to the end shaft and supported by the engine proper at the outer end thereof, and wherein one of the first elastic support member supports the power unit at the outer end of the intermediate shaft while the other supports the intermediate shaft near the differential gear.

* * * * *